(12) United States Patent
Xie

(10) Patent No.: US 10,222,639 B2
(45) Date of Patent: Mar. 5, 2019

(54) LIQUID CRYSTAL PANEL, LIQUID CRYSTAL DISPLAY DEVICE AND METHOD FOR IMPROVING LIQUID CRYSTAL ROTATION OBSTACLE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 219 days.

(21) Appl. No.: 15/125,187

(22) PCT Filed: Jul. 12, 2016

(86) PCT No.: PCT/CN2016/089782
§ 371 (c)(1),
(2) Date: Sep. 12, 2016

(87) PCT Pub. No.: WO2017/219406
PCT Pub. Date: Dec. 28, 2017

(65) Prior Publication Data
US 2018/0217419 A1    Aug. 2, 2018

(30) Foreign Application Priority Data
Jun. 25, 2016  (CN) .......................... 2016 1 0475306

(51) Int. Cl.
*G02F 1/13*    (2006.01)
*G02F 1/133*   (2006.01)
(Continued)

(52) U.S. Cl.
CPC ............ *G02F 1/1323* (2013.01); *G02F 1/133* (2013.01); *G02F 1/133382* (2013.01);
(Continued)

(58) Field of Classification Search
None
See application file for complete search history.

(56) References Cited

U.S. PATENT DOCUMENTS

2007/0153196 A1* 7/2007 Jang ...................... G02F 1/1323
                                                         349/141
2007/0290965 A1* 12/2007 Shiraishi ............. G02F 1/13452
                                                         345/87

FOREIGN PATENT DOCUMENTS

| CN | 101097316 A | 1/2008 |
| CN | 101183184 A | 5/2008 |

(Continued)

*Primary Examiner* — James A Dudek
(74) *Attorney, Agent, or Firm* — Andrew C. Cheng

(57) ABSTRACT

A liquid crystal panel includes oppositely disposed upper and lower substrates having a liquid crystal disposed therebetween. A surface of the upper substrate and a surface of the lower substrate are formed with viewing angle upper and lower electrodes respectively, and a length of the lower electrode is shorter than that of the upper electrode. The upper electrode completely covers projection of the lower electrode on the upper substrate. A region between the upper and lower electrodes includes adjacent main body region and pretilt region, the pretilt region is corresponding to edges of the upper and lower electrodes, and portions of the upper and lower electrodes corresponding to the main body region have same sizes. A liquid crystal display device and a method for improving liquid crystal rotation obstacle further are provided. Accordingly, a response time of viewing angle switching is reduced and viewing angle symmetry is improved.

10 Claims, 3 Drawing Sheets

(51) Int. Cl.
*G02F 1/1333* (2006.01)
*G02F 1/1343* (2006.01)
*G02F 1/137* (2006.01)

(52) U.S. Cl.
CPC ........ *G02F 1/134363* (2013.01); *G02F 1/137* (2013.01); *G02F 2001/13706* (2013.01); *G02F 2001/13712* (2013.01); *G02F 2001/134345* (2013.01); *G02F 2001/134381* (2013.01); *G02F 2201/121* (2013.01); *G02F 2201/123* (2013.01)

(56) References Cited

FOREIGN PATENT DOCUMENTS

| | | |
|---|---|---|
| CN | 100495136 C | 6/2009 |
| CN | 101498869 A | 8/2009 |
| CN | 102253541 A | 11/2011 |
| CN | 103852939 A | 6/2014 |
| CN | 104460138 A | 3/2015 |
| JP | 2011027951 A | 2/2011 |

* cited by examiner

LIQUID CRYSTAL PANEL, LIQUID CRYSTAL DISPLAY DEVICE AND METHOD FOR IMPROVING LIQUID CRYSTAL ROTATION OBSTACLE

CROSS REFERENCE TO RELATED APPLICATION

This application claims the priority of Chinese Patent Application No. 201610475306.1, entitled "Liquid Crystal Panel, Liquid Crystal Display Device and Method for Improving Liquid Crystal Rotation Obstacle", filed on Jun. 25, 2016, the disclosure of which is incorporated herein by reference in its entirety.

FIELD OF THE INVENTION

The invention relates to the field of liquid crystal related manufacturing technology, and particularly to a liquid crystal panel, a liquid crystal display device and a method for improving liquid crystal rotation obstacle.

BACKGROUND OF THE INVENTION

With the popularization and promotion of mobile and application products using liquid crystal display devices, people have put forward higher and higher requirements to the quality and humanized design of products. Viewing angle range is an important performance index of a liquid crystal display panel, and the liquid crystal display panel needs to change a polarization state of light by adjusting an arrangement of liquid crystal molecules and thereby controls the light passing quantity between upper and lower polarizing layers, so as to achieve display function. Although the existing liquid crystal display panel has been developed towards the direction of wide viewing angle, in some cases, the liquid crystal display panel needs to have a function of switching between wide viewing angle and narrow viewing angle. For example, sometimes the user needs to share an image displayed by a portable electronic device to others, and sometimes the user does not want others to watch the displayed image for the purpose of protecting personal privacy, and therefore there is a need of a display device capable of realizing the switching between wide viewing angle and narrow viewing angle to meet the two requirements.

In the prior art, the switching between wide viewing angle and narrow viewing angle of the display panel actually is achieved by a switching between horizontal orientation and vertical orientation of liquid crystal molecules. For example, when the liquid crystal molecules are a positive liquid crystal, a viewing angle control is achieved by controlling viewing angle upper and lower electrodes which are disposed adjacent to a pixel electrode and a common electrode in a normal liquid crystal display area. When the viewing angle upper and lower electrodes are applied with a voltage, a vertical electric field is generated, and the original horizontally oriented liquid crystal molecules would gradually stand up under the effect of electric field force. However, since the liquid crystal molecules are rod-like structures, the direction of the liquid crystal standing is not fixed, the liquid crystal may stand up starting from one end or from the other end. Therefore, during the process of the liquid crystal standing, "fight" phenomenon would be easily occurred, which would cause a disorder state and eventually result in slow response to viewing angle switching and poor viewing angle symmetry after the viewing angle switching.

SUMMARY OF THE INVENTION

Accordingly, technical problems expected to be solved by the invention are that the occurrence of disorder state caused by uncertain rotation directions of liquid crystal molecules, and long response time of viewing angle switching as well as poor viewing angle symmetry caused by rotation obstacle of liquid crystal molecules, during the process of mutual switching between wide viewing angle and narrow viewing angle of the liquid crystal display panel in the prior art.

In order to solve the above technical problems, the invention provides a liquid crystal panel including an upper substrate and a lower substrate oppositely disposed to each other, the upper substrate and the lower substrate have a liquid crystal disposed therebetween, a surface of the upper substrate facing towards the lower substrate is disposed with a viewing angle upper electrode, and a surface of the lower substrate facing towards the upper substrate is disposed with a viewing angle lower electrode. A length of the viewing angle lower electrode is shorter than a length of the viewing angle upper electrode, the viewing angle upper electrode completely covers a projection of the viewing angle lower electrode on the upper substrate, a region between the viewing angle upper electrode and the viewing angle lower electrode includes a main body region and a pretilt region adjacent to each other, the pretilt region is corresponding to an edge of the viewing angle upper electrode and an edge of the viewing angle lower electrode, a portion of the viewing angle upper electrode and a portion of the viewing angle lower electrode which are corresponding to the main body region have same sizes.

In an embodiment, a center of the viewing angle upper electrode is directly above a center of the viewing angle lower electrode.

In an embodiment, the number of the pretilt region is two, and the two pretilt regions are symmetrically arranged at two sides of the main body region.

In an embodiment, a length of each of the pretilt regions on a direction parallel to a lengthwise direction of the viewing angle lower electrode is equal to a distance between a pixel electrode and a common electrode of in-plane switching liquid crystal panel.

In an embodiment, the liquid crystal is a positive liquid crystal horizontally aligned at an initial state of being not applied with voltage.

In an embodiment, the liquid crystal is a negative liquid crystal vertically aligned at an initial state of being not applied with voltage.

The invention further provides a liquid crystal display device. The liquid crystal display device includes a backlight module, a driving circuit and a viewing angle switchable liquid crystal panel. The driving circuit is configured (i.e., structured and arranged) for controlling the backlight module and the liquid crystal panel to work, and the backlight module is configured for providing a backlight source to the liquid crystal panel for image display.

In an embodiment, the liquid crystal panel includes an upper substrate and a lower substrate oppositely disposed to each other, the upper substrate and the lower substrate have liquid crystal molecules disposed therebetween, a surface of the upper substrate facing towards the lower substrate is disposed with a viewing angle upper electrode, a surface of the lower substrate facing towards the upper substrate is disposed with a viewing angle lower electrode, a length of the viewing angle lower electrode is shorter than a length of the viewing angle upper electrode, the viewing angle upper electrode completely covers a projection of the viewing angle lower electrode on the upper substrate, a region between the viewing angle upper electrode and the viewing angle lower electrode includes a main body region and a pretilt region adjacent to each other, the pretilt region is corresponding to an edge of the viewing angle upper electrode and an edge of the viewing angle lower electrode, a portion of the viewing angle upper electrode and a portion of the viewing angle lower electrode both corresponding to the main body region have same sizes.

In an embodiment, a center of the viewing angle upper electrode is directly above a center of the viewing angle lower electrode.

In an embodiment, the amount of the pretilt region is two, and the two pretilt regions are symmetrically arranged at two sides of the main body region.

In an embodiment, a length of each of the pretilt regions on a direction parallel to a lengthwise direction of the viewing angle lower electrode is equal to a distance between a pixel electrode and a common electrode of in-plane switching liquid crystal panel.

In an embodiment, the liquid crystal molecules are a positive liquid crystal horizontally aligned at an initial state of being not applied with voltage.

In an embodiment, the liquid crystal molecules are a negative liquid crystal vertically aligned at an initial state of being not applied with voltage.

The invention still further provides a method for improving liquid crystal rotation obstacle, adapted for a viewing angle switchable liquid crystal panel. In particular, a viewing angle upper electrode and a viewing angle lower electrode mutually corresponding to each other are disposed on an upper substrate and a lower substrate respectively in a sub pixel area, a length of the viewing angle upper electrode is shorter than a length of the viewing angle lower electrode, and the viewing angle upper electrode completely covers a projection of the viewing angle lower substrate on the upper substrate; a region between the viewing angle upper electrode and the viewing angle lower electrode is divided into a main body region and a pretilt region adjacent with each other, the pretilt region is corresponding to an edge of the viewing angle upper electrode and an edge of the viewing angle lower electrode, a portion of the viewing angle upper electrode and an portion of the viewing angle lower electrode both corresponding to the main body region have same sizes; a voltage is applied to make the pretilt region to generate an oblique electric field, wherein liquid crystal molecules in the pretilt region are obliquely oriented under the effect of the oblique electric field; a light irradiation is performed on the obliquely oriented liquid crystal molecules to make the obliquely oriented liquid crystal molecules to form an initial pretilt angle; the voltage is stopped applying and thereby liquid crystal molecules in the main body region restore to an initial state while the liquid crystal molecules in the pretilt region maintain the initial pretilt angle; and another voltage is applied onto the viewing angle upper electrode and the viewing angle lower electrode and thereby the liquid crystal molecules in the pretilt region drive the liquid crystal molecules in the main body region to orderly rotate.

In an embodiment, the step of a light irradiation being performed on the obliquely oriented liquid crystal molecules to make the obliquely oriented liquid crystal molecules to form an initial pretilt angle includes: using a covering method by a masking plate which is formed with a gap only corresponding to the pretilt region and performing a UV light irradiation on the gap to make the obliquely oriented liquid crystal molecules to form the initial pretilt angle.

In an embodiment, a main pixel area of the liquid crystal panel is horizontal alignment, and the sub pixel area is vertical alignment.

Efficacy can be achieved by the invention is as follows: the lengths of the viewing angle upper and lower electrodes are different from each other, the portion(s) corresponding to the length difference generate(s) an oblique electric field to make some liquid crystal molecules to be obliquely oriented, and the liquid crystal molecules then are irradiated by UV light to form an initial pretilt angle; after that, when applying a voltage onto the viewing angle upper and lower electrodes, the liquid crystal molecules in the pretilt region would drive liquid crystal molecules in adjacent main body region to rotate, so that the liquid crystal can orderly rotate starting from a same end, the "fight" phenomenon among the liquid crystal molecules can be avoided, the response time of viewing angle switching can be reduced and the viewing angle symmetry after the viewing angle switching can be improved.

BRIEF DESCRIPTION OF THE DRAWINGS

In order to more clearly illustrate technical solutions of embodiments of the invention or the prior art, drawings will be used in the description of embodiments or the prior art will be given a brief description below. Apparently, the drawings in the following description only are some of embodiments of the invention, the ordinary skill in the art can obtain other drawings according to these illustrated drawings without creative effort.

DETAILED DESCRIPTION OF THE PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
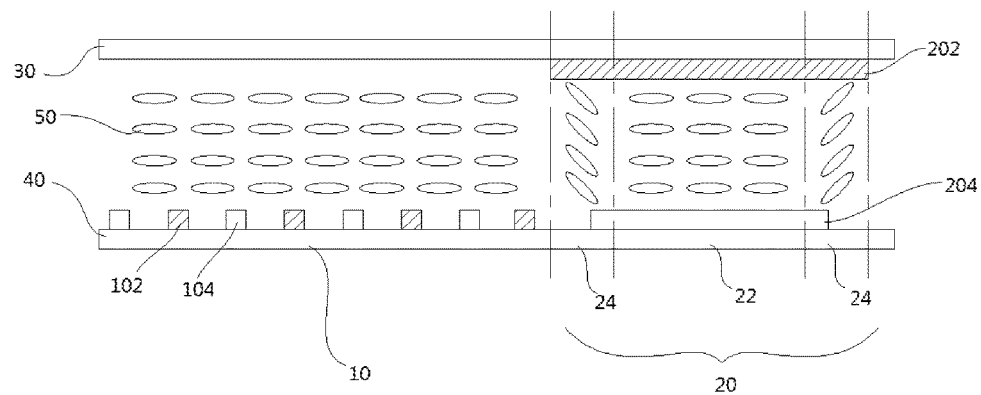
FIG. 1 is a schematic structural view of a viewing angle switchable liquid crystal panel provided by a first embodiment of the invention.

FIG. 1 is a schematic structural view of a viewing angle switchable liquid crystal panel according to a first embodiment of the invention. As illustrated in the figure, the viewing angle switchable liquid crystal panel includes an upper substrate 30, a lower substrate 40 and liquid crystal molecules 50 arranged therebetween. The liquid crystal molecules are a positive liquid crystal. A pixel unit of the liquid crystal panel includes a main pixel area 10 and a sub pixel area 20. On the lower substrate 40 of the main pixel area 10, pixel electrodes 102 and common electrodes 104 are alternately arranged; the main pixel area is horizontal orientation/alignment, the liquid crystal molecules 50 in the main pixel area only can rotate in a plane parallel to the upper substrate 30 and the lower substrate 40, and therefore is at an in-plane switching (IPS) mode. When there is no voltage is applied, the liquid crystal molecules 50 in the main pixel area 10 completely are not rotated, since polarization directions of front and rear two polarizers of the liquid crystal panel are perpendicular to each other, the polarization direction of a backlight source provided by a backlight module of the display device and passing through the rear polarizer would not be changed by the liquid crystal molecules 50 and therefore cannot pass through the front polarizer, so that the liquid crystal panel can only display black. When a voltage is applied, the liquid crystal molecules are rotated, the horizontal polarized light is converted to a vertical polarized light, and thus the backlight rays can pass through, the amount of converted polarized light can be controlled by changing the magnitude of an electric field applied between the two sides of the liquid crystal molecules 50 and therefore the purpose of controlling light rays is achieved. The IPS mode of the main pixel area improves the viewing angle in the manner of in-plane switching, uses changes of space thickness, friction strength and transverse electric field to make the liquid crystal molecules 50 to reach a maximum plane rotation angle and thereby to increase the viewing angle, and therefore has the advantage of large viewing angle. Meanwhile, there is no need of additional compensation film during manufacturing the liquid crystal panel, so that the visual display is good and the color is delicate.

Figure 2:
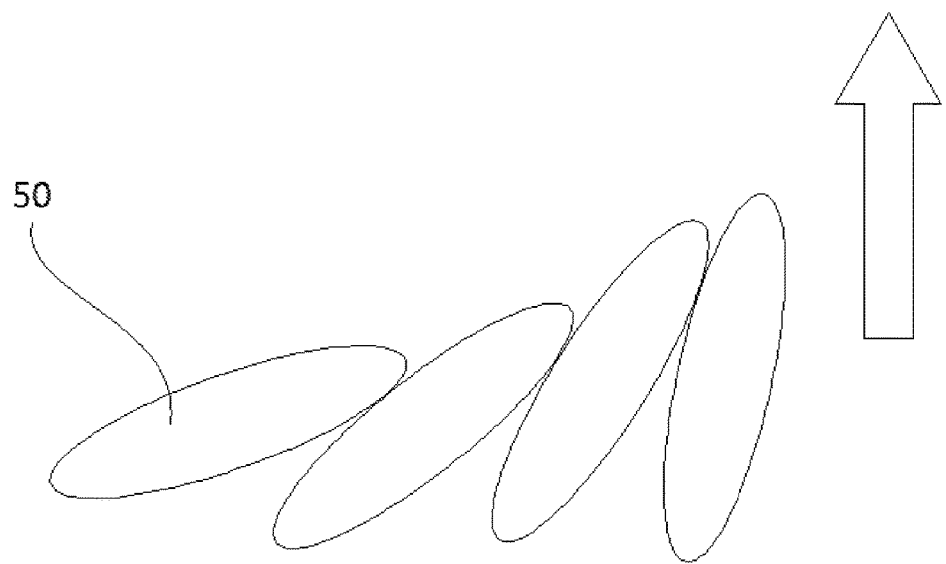
FIG. 2 is a principle diagram of liquid crystal rotation in a sub pixel area of the liquid crystal panel provided by the first embodiment of the invention.

In the sub pixel area 20, a surface of the upper substrate 30 facing toward the lower substrate 40 is disposed with a viewing angle upper electrode 202, a surface of the lower substrate 40 facing towards the upper substrate 30 is disposed with a viewing angle lower electrode 204, a length of the viewing angle lower electrode 204 is shorter than a length of the viewing angle upper electrode 202, and the viewing angle upper electrode 202 completely covers a vertical projection of the viewing angle lower electrode 204 on the upper substrate 30. The sub pixel area 20 is divided into positionally-adjacent a main body region 22 and pretilt regions 24. The pretilt regions 24 each are corresponding to an edge of the viewing angle upper electrode 202 and an edge of the viewing angle lower electrode 204, a portion of the viewing angle upper electrode 202 and a portion of the viewing angle lower electrode 204 which both are rightly corresponding to the main body region 22 have same sizes. When the viewing angle upper electrode 202 and the viewing angle lower electrode 204 are applied with a voltage therebetween, a vertical electric field is generated between the viewing angle upper 202 and the viewing angle lower electrode 204 in the main body area 22, and an oblique electric field is generated between the viewing angle upper electrode 202 and the viewing angle lower electrode 204 in the pretilt regions 24 so that the liquid crystal molecules 50 in each of the pretilt regions 24 produce an initial pretilt angle. In an embodiment, a center of the viewing angle upper electrode 202 is directly on a center of the viewing angle lower electrode 204, i.e., a center of the vertical projection of the viewing angle upper electrode 202 on the upper substrate 30 and a center of the vertical projection of the viewing angle lower electrode 204 on the upper substrate 30 are overlapped/coincided with each other, and at this time there are two same pretilt regions 24 located at two ends of the main body region 22. Of course, the projection centers of the viewing angle upper electrode 202 and the viewing angle lower electrode 204 may be not coincided with each other, for example the viewing angle lower electrode 204 is biased/shifted towards one end of the viewing angle upper electrode 202, and at this situation the two pretilt regions 24 have different sizes, strengths of the generated oblique electric fields in the two pretilt regions 24 are different, the effects applied onto the rotations of corresponding liquid crystal molecules 50 are different correspondingly. Preferably, a length of single pretilt region 24 on a direction parallel to the lengthwise direction of the viewing angle lower electrode 204 is set to be equal to a distance between the pixel electrode 102 and the common electrode 104 in the main pixel area 10, and at this situation the quantity of liquid crystal molecules affected by the pretilt regions 24 at the two ends of the sub pixel area 20 is same as the quantity of liquid crystal molecules 50 controlled by one pair of pixel electrode 102 and common electrode 104, the control effect of the oblique electric field applied onto the liquid crystal molecules 50 in the pretilt regions 24 is the best. When no voltage is applied, an initial state of the liquid crystal molecules in the main body region 22 is a horizontal lying state, the sub pixel area 20 displays an image, the liquid crystal panel is at a wide viewing angle display mode, an initial state of the liquid crystal molecules 50 in the pretilt regions 24 is an oblique arrangement/alignment with an initial pretilt angle α, the magnitude of the initial pretilt angle α is determined by a length difference between the viewing angle upper electrode 202 and the viewing angle lower electrode 204 and an magnitude of the applied voltage when fixing the initial pretilt angle α. In conjunction with FIG. 2, after the voltage is applied, the liquid crystal molecules 50 in the pretilt region 24 are rotated starting from an oblique state to a vertical state, and meanwhile sequentially drive adjacent liquid crystal molecules 50 in the main body region 22 to rotate along a same direction from the horizontal lying state to the vertical state, the sub pixel area 20 leaks light and does not display an image, the liquid crystal panel is at a narrow viewing angle display mode.

The sub pixel area 20 is disposed with the pretilt regions 24, when a voltage is applied onto the viewing angle upper electrode 202 and the viewing angle lower electrode 204, the liquid crystal molecules 50 at two ends of the viewing angle upper electrode 202 and the viewing angle lower electrode 204 would drive neighboring liquid crystal molecules 50 to rotate, so that all the liquid crystal molecules 50 can orderly rotate starting from a same end, the "fight" phenomenon occurred among the liquid crystal molecules 50 is avoided, the response time of viewing angle switching is reduced and the viewing angle symmetry after the viewing angle switching is improved consequently.

A method for improving liquid crystal rotation obstacle according to the first embodiment of the invention specifically includes steps as follows.

Step one: applying a voltage onto the viewing angle upper electrode 202 and the viewing angle lower electrode 204 in the sub pixel area 20. Since the length of the viewing angle lower electrode 204 is shorter than the viewing angle upper electrode 202, the pretilt regions 24 at the two ends of the sub pixel area 20 generate an oblique electric field, the positive liquid crystal molecules 50 with an initial state of horizontal lying are rotated to a state parallel to oblique electric field lines 62 under the effect of the oblique electric field, the main body region 22 in the middle of the sub pixel area 20 generates a vertical electric field to make the liquid crystal molecules therein to be rotated to a vertical state parallel to vertical electric field lines 64.

The oblique electric field in the pretilt regions 24 makes the liquid crystal molecules 50 in such regions be obliquely oriented/aligned, which facilitates subsequent fixing of initial pretilt angle α.

Figure 3:
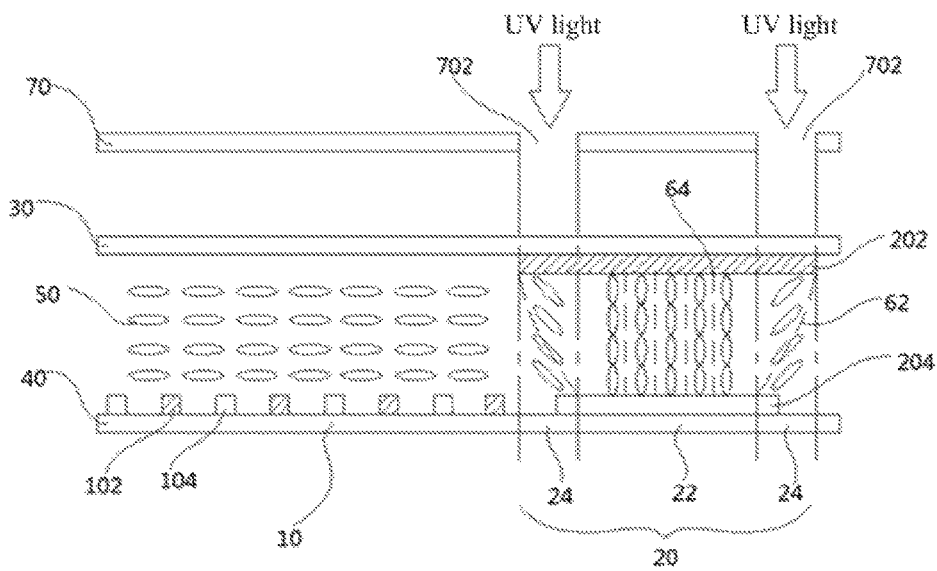
FIG. 3 is a schematic view of a method for improving liquid crystal rotation obstacle provided by the first embodiment of the invention.

Step two: as shown in FIG. 3, providing a masking plate 70. The masking plate 70 is formed with two gaps 702 only corresponding to the pretilt regions 24. The gaps 702 are irradiated by UV light for making the obliquely aligned liquid crystal molecules in the pretilt regions 24 to form an initial pretilt angle.

The method of using the masking plate to cover and using the UV light to irradiate can relatively simply to obtain the initial pre-tilt angle α. The magnitude of the initial pretilt angle α is determined by oblique angles of the oblique electric field lines 62, i.e., is related to the length difference of the viewing angle upper and lower electrodes and the magnitude of the applied voltage.

Step three: stopping applying the voltage. The liquid crystal molecules 50 in the main body region 22 restore to the initial horizontal lying state, the liquid crystal molecules 50 in the pretilt regions 24 maintain the initial pretilt angle α. After that, when applying a voltage onto the viewing angle upper electrode 202 and the viewing angle lower electrode 204, the liquid crystal molecules 50 in the pretilt regions 24 would drive adjacent liquid crystal molecules 50 in the main body region 22 to orderly rotate along one direction.

The lengths of the viewing angle upper electrode 202 and the viewing angle lower electrode 204 are not equal, the portion corresponding to the length difference generates an oblique electric field to make some liquid crystal molecules to be obliquely oriented, and the liquid crystal molecules 50 would form the initial pretilt angle α after UV light irradiation. After that, when applying an voltage onto the viewing angle upper electrode 202 and the viewing angle lower electrode 204, the liquid crystal molecules 50 in the pretilt regions 24 would drive the liquid crystal molecules 50 in the adjacent main body region 22 to rotate, so that the liquid crystal molecules 50 in the sub pixel area 20 can orderly rotate starting from a same end, the "fight" phenomenon of liquid crystal molecules 50 is avoided, and therefore response time of viewing angle switching is reduced and viewing angle symmetry after the viewing angle switching is improved.

Figure 4:
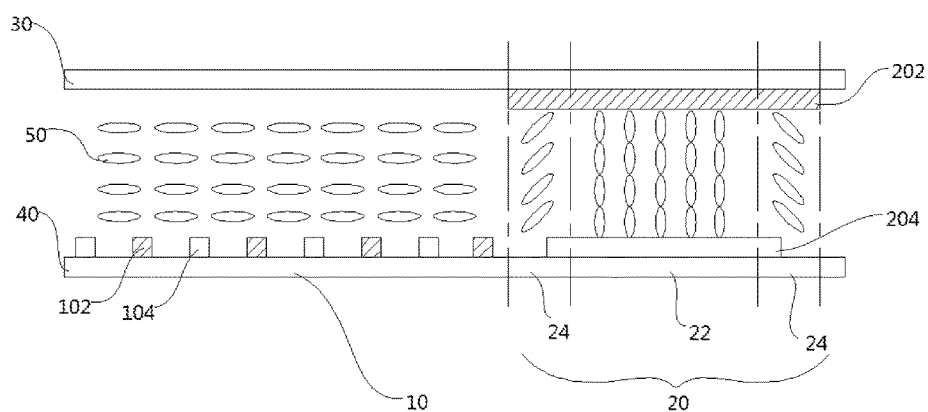
FIG. 4 is a schematic structural view of a viewing angle switchable liquid crystal panel provided by a second embodiment of the invention.
Figure 5:
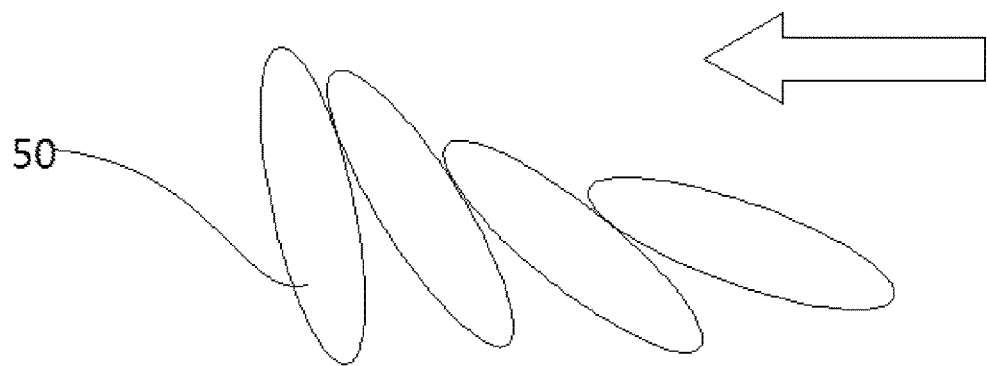
FIG. 5 is a principle diagram of liquid crystal rotation in a sub pixel area of the liquid crystal panel provided by the second embodiment of the invention.

FIG. 4 is a schematic structural view of a viewing angle switchable liquid crystal panel according to a second embodiment of the invention. As shown in the figure, a difference of the second embodiment from the first embodiment is that: the liquid crystal molecules 50 is a negative liquid crystal. A working principle of the main body area 10 is the same as that in the first embodiment; in the sub pixel area 20, an initial state of the liquid crystal molecules 50 of the main body region 22 is at a vertical/upright state, the sub pixel area 20 leaks light and thus does not display an image, the liquid crystal panel is at a narrow viewing angle display mode, an initial state of the liquid crystal molecules 50 of the pretilt regions 24 is an oblique alignment with an initial pretilt angle α, the magnitude of the pretilt angle α is determined by a length difference between the viewing angle upper electrode 202 and the viewing angle lower electrode 204 and a magnitude of an applied voltage during fixing the initial pretilt angle α. In conjunction with FIG. 5, after a voltage is applied, the liquid crystal molecules 50 in the pretilt regions 24 are rotated starting from the oblique alignment to a horizontal lying state and meanwhile drive the liquid crystal molecules 50 in the adjacent main body region 22 to rotate along a same direction from the vertical state to a horizontal lying state, the sub pixel area 20 displays an image, and the liquid crystal panel is at a wide viewing angle display mode.

Figure 6:
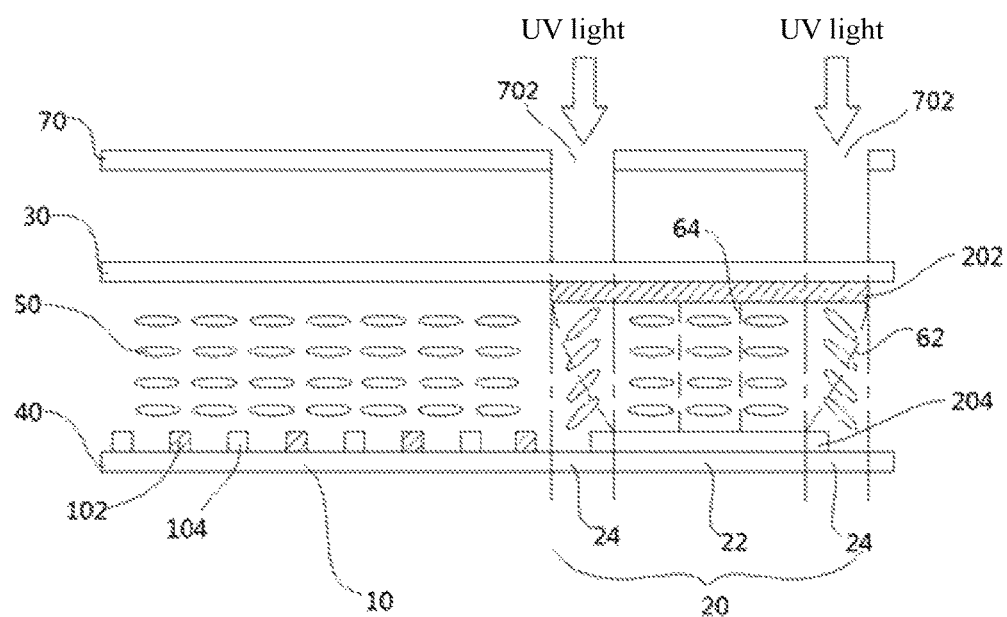
FIG. 6 is schematic view of a method for improving liquid crystal rotation obstacle provided by the second embodiment of the invention

Steps of a method for improving liquid crystal rotation obstacle according to the second embodiment are similar to that of the first embodiment, as shown in FIG. 6, a difference is that the liquid crystal molecules 50 in the second embodiment are a negative liquid crystal, the initial state of the liquid crystal molecules 50 in the sub pixel area 20 is the vertical state, after the viewing angle upper electrode 202 and the viewing angle lower electrode 204 are applied with a voltage, the liquid crystal molecules 50 in the main body region 22 are rotated to a horizontal lying state perpendicular to the vertical electric field lines 64 from the vertical state, the oblique electric field in the pretilt regions 24 makes the liquid crystal molecules 50 in such regions to be obliquely aligned along a direction perpendicular to the oblique electric field lines, and then a manner of using a UV light to irradiate gaps of a masking plate is adopted to obtain the initial pretilt angle α. The viewing angle upper electrode 202 and the viewing angle lower electrode 204 are at a narrow viewing angle mode when no voltage is applied therebetween, and then switched to a wide viewing angle mode after a voltage is applied therebetween, because the liquid crystal molecules 50 orderly rotate along a same direction, the "fight" phenomenon among the liquid crystal molecules 50 is avoided, the response time of viewing angle switching is reduced and the viewing angle symmetry after the viewing angle switching is improved consequently.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal panel comprising: an upper substrate and a lower substrate oppositely disposed to each other, the upper substrate and the lower substrate having liquid crystal molecules disposed therebetween, a surface of the upper substrate facing towards the lower substrate being disposed with a viewing angle upper electrode, and a surface of the lower substrate facing towards the upper substrate being disposed with a viewing angle lower electrode; wherein a length of the viewing angle lower electrode is shorter than a length of the viewing angle upper electrode, the viewing angle upper electrode completely covers a projection of the viewing angle lower electrode on the upper substrate, a region between the viewing angle upper electrode and the viewing angle lower electrode comprises a main body region and a pretilt region adjacent to each other, the pretilt region is corresponding to an edge of the viewing angle upper electrode and an edge of the viewing angle lower electrode, a portion of the viewing angle upper electrode and a portion of the viewing angle lower electrode which are corresponding to the main body region have same sizes; and wherein a center of the viewing angle upper electrode is directly above a center of the viewing angle lower electrode.

2. The liquid crystal panel as claimed in claim 1, wherein a number of the pretilt region is two, and the two pretilt regions are symmetrically arranged at two sides of the main body region.

3. The liquid crystal panel as claimed in claim 2, wherein a length of each of the pretilt regions on a direction parallel to a lengthwise direction of the viewing angle lower electrode is equal to a distance between a pixel electrode and a common electrode of in-plane switching liquid crystal panel.

4. The liquid crystal panel as claimed in claim 1, wherein the liquid crystal molecules are a positive liquid crystal and horizontally aligned at an initial state of being not applied with voltage.

5. The liquid crystal panel as claimed in claim 1, wherein the liquid crystal molecules are a negative liquid crystal and vertically aligned at an initial state of being not applied with voltage.

6. A liquid crystal display device comprising a backlight module, a driving circuit and a liquid crystal panel; wherein the driving circuit is configured for controlling the backlight module and the liquid crystal panel to work, and the backlight module is configured for providing a backlight source to the liquid crystal panel for image display;

wherein the liquid crystal panel comprises an upper substrate and a lower substrate oppositely disposed to each other, the upper substrate and the lower substrate have liquid crystal molecules disposed therebetween, a surface of the upper substrate facing towards the lower substrate is disposed with a viewing angle upper electrode, a surface of the lower substrate facing towards the upper substrate is disposed with a viewing angle lower electrode, a length of the viewing lower electrode is shorter than a length of the viewing angle upper electrode, the viewing angle upper electrode completely covers a vertical projection of the viewing angle lower electrode on the upper substrate, a region between the viewing angle upper electrode and the viewing angle lower electrode comprises a main body region and a pretilt region adjacent to each other, the pretilt region is corresponding to an edge of the viewing angle upper electrode and an edge of the viewing angle lower electrode, a portion of the viewing angle upper electrode and a portion of the viewing angle lower electrode both corresponding to the main body region have same sizes; and wherein a center of the viewing angle upper electrode is directly above a center of the viewing angle lower electrode.

7. The liquid crystal display device as claimed in claim 6, wherein a number of the pretilt region is two, and the two pretilt regions are symmetrically arranged at two sides of the main body region.

8. The liquid crystal display device as claimed in claim 7, wherein a length of each of the pretilt regions on a direction parallel to a lengthwise direction of the viewing angle lower electrode is equal to a distance between a pixel electrode and a common electrode of in-plane switching liquid crystal panel.

9. The liquid crystal display device as claimed in claim 6, wherein the liquid crystal molecules are a positive liquid crystal and horizontally aligned at an initial state of being not applied with voltage.

10. The liquid crystal display device as claimed in claim 6, wherein the liquid crystal molecules are a negative liquid crystal and vertically aligned at an initial state of being not applied with voltage.

\* \* \* \* \*